United States Patent Office 3,443,813
Patented May 13, 1969

3,443,813
COOLING DEVICE FOR SEALING RINGS
Konrad Valdemar Carlsson, Solna, Sweden, assignor to Stenberg-Flygt AB, Solna, Sweden
Filed July 12, 1966, Ser. No. 564,567
Claims priority, application Sweden, July 22, 1965, 9,698/65
Int. Cl. F16j 15/54, 15/16
U.S. Cl. 277—18    4 Claims

ABSTRACT OF THE DISCLOSURE

An arrangement for liquid cooling seal rings of a rotatable shaft utilizes liquid sealed by the rings and the rotation of the shaft to force this liquid into cooling relationship with the seal rings by means of a fixed guide surface. The fixed guide surface extends axially of the shaft as three continuous portions, a first portion spaced from the shaft blending into a second portion extending toward the shaft and a third portion close to the shaft so that upon rotation of the shaft oil is forced into the third portion and out of the third portion against the ring to be cooled.

---

Figure 1:
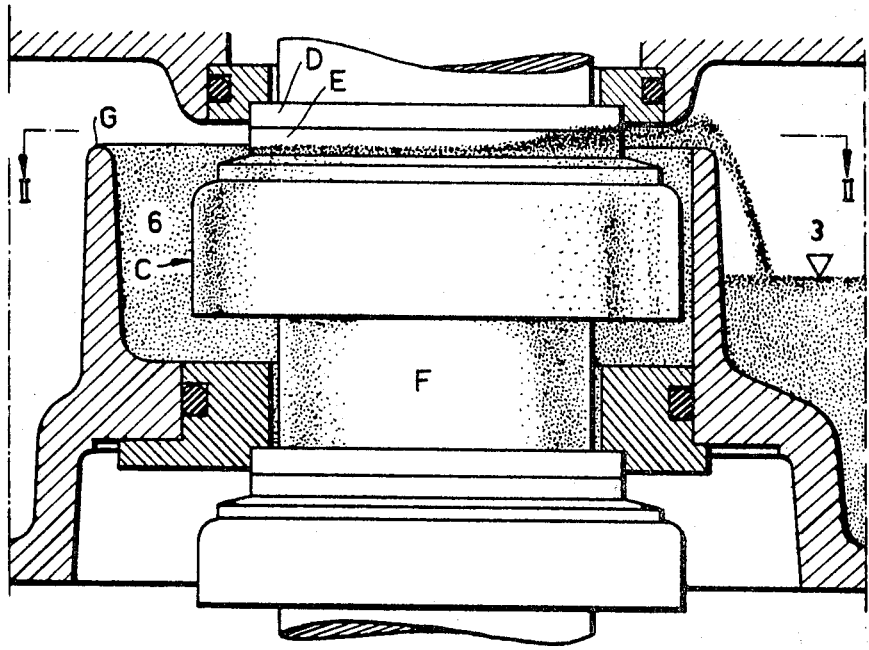

The present invention relates to a cooling arrangement for sealing rings intended for sealing a rotatable shaft between two separate spaces containing different mediums, e.g., oil and water respectively.

Sealing rings of the type in question are utilized to a great extent, for example in immersible pumps where it is necessary to lead the electric drive-motor shaft to the pump impeller through a stuffing box between the motor housing and the pump housing, the stuffing box being filled with oil.

The stuffing box is usually sealed relative the motor housing as well as the pump housing by means of sealing rings which comprise a flat ring which can be manufactured from steel, for example, secured to the gland wall and a flat sealing ring which can also be made of steel which is spring-biased against said first mentioned ring and rotating with the drive motor shaft.

One disadvantage which has to be overcome in such sealing rings, is a tendency for the face-type ring to become heated due to friction, one such heating is not permissible from an operational viewpoint. With heating oil between both sealing rings becomes less viscous, the oil film becomes thinner and further heating occurs, which can reach such high local temperature peaks that the oil coagulates or forms carbon deposits on the sealing rings, which results in the subjection of the rings to great wear and possible seizure.

An attempt has been made to abduct heat from the rotating sealing ring by arranging concentric channels in the slip rings through which oil is led into the shaft of the pump unit. However, the oil in the oil space shows a tendency to be expelled from the oil space and from the rotating portions of the shaft by centrifugal force, so that a ring-shaped air channel is formed round the shaft, which is only broken sporadically by the oil, and such channels have, therefore, shown a lack of efficiency. If the oil level drops due to leakage from the oil space, this condition becomes yet more critical and in the case of a vertical shaft the upper flat sealing ring lacks cooling almost entirely.

The present invention obviates the above disadvantages and is essentially characterized in that one or more fixed guide surfaces are arranged in a suitable manner on the walls, bottom or cover of the oil space, the generatrix of which run in a direction substantially parallel to the rotatable shaft, such guide surfaces, seen from the rotational direction of the shaft, continuously run from one position at a greater distance from the shaft, to a position at a shorter distance from the shaft and subsequently run more or less at a transverse angle in towards the shaft to finally follow the shaft or a rotating portion of it at an insignificant distance from the shaft.

According to one embodiment of the invention these guide surfaces extend in an axial direction to terminate with a suitably radiused edge at a distance from the sealing ring to be cooled.

In the case where the shaft is intended for rotation in both directions, the guide surfaces are arranged symmetrically with a central section nearest to the shaft with two wings leading away from the shaft.

Figure 2:
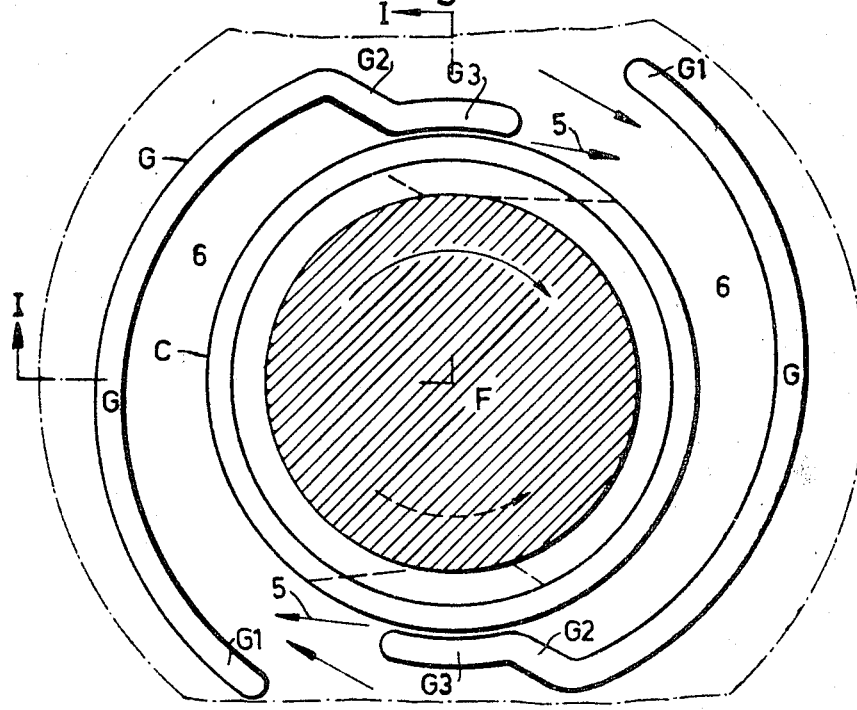
Figure 3:
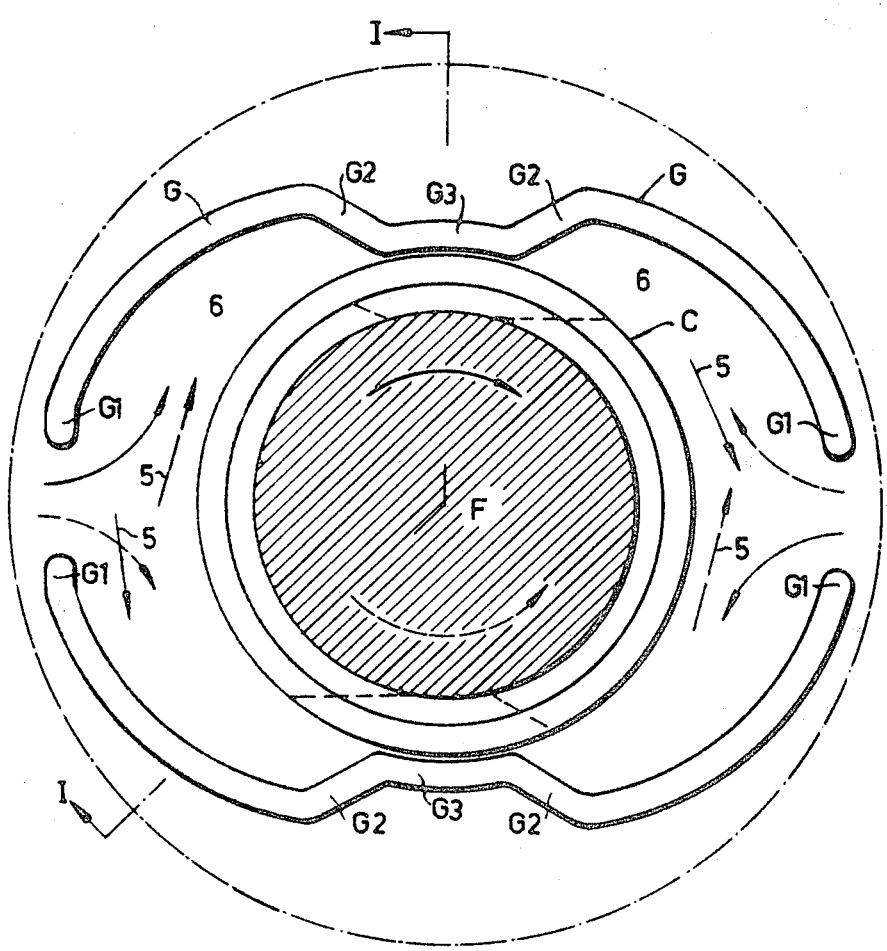

The invention will now be described more in detail, reference being made to the appended drawings, in which
FIG. 1 shows an axial sectional view taken on line I—I of FIG. 2 or FIG. 3,
FIG. 2 shows a radial sectional view taken on line II—II of FIG. 1 showing the same embodiment, and
FIG. 3 shows a radial sectional view similar to FIG. 2 but through another embodiment of the invention.

In the embodiment shown in FIGURES 1 and 2 a guide surface G is manufactured in such a way that when a sealing ring cover C rotates, face-type sealing rings. i.e., fixed ring D and ring E rotating with the shaft and the shaft F are cooled by the fluid driven along by this rotation. In this embodiment the fluid being oil which is held in the surrounding space. To indicate the existence of the oil, the sections of the oil space in question and the space between the guide surfaces and the shaft are marked with dots. In the oil space the oil is presumed to have sunk below the sealing rings D and E to the level 3.

The guide surfaces G are arranged in the following way:

(1) At area G1, there is provided the desired exchange of cold and hot coolant in the channel 6 and the desired volume of fluid which flushes in towards the center at area G2. This can possibly be regulated by picking up a desired volume from the fluid jet 5.

(2) At area G2, the cross-sectional area of the channel 6 seen along the rotational direction of the shaft decreases rapidly at an angle that can be between 20° and 170° to the tangent to the cover of the seal C. This angle and the supplied volume of fluid define how close to the cover C the fluid shall be guided.

(3) At area G3, the guide surface G and the cover C have a small amount of play or clearance whereby a slowing up of the fluid driven along is obtained, a coolant bank or build up being formed which brings the coolant into contact with the sealing rings D and E if the oil level has sunk to 3.

Thus, the control of the fluid according to the invention prevents the formation of a ring-shaped air space round the sealing rings D and E. Instead, the heat is abducted with the fluid as the fluid is flushed against D and E. This also occurs even at a low fluid level as the guide surfaces G drive the fluid up when the cover C rotates.

The embodiment of FIG. 3 is essentially the same in operation and theory as FIG. 2 but is formed to accommodate a shaft F rotatable in opposite directions. Thus, the G3 area of guide G is connected at both sides of the G2 area. The oil flow is shown in full lines for clockwise rotation and is shown in dashed lines for counterclockwise rotation.

The invention causes the temperature of sealing rings in pumps of the above described type, to be decreased by 20°–60° C., the temperature normally rising to an average of approximately 125° C., as laboratory tests have shown, the operational security being considerably increased and all tendencies of coagulation or carbonization of the oil being eliminated.

I claim:
1. An arrangement for liquid cooling seal rings (D, E)

of a rotatable shaft (F) in which liquid for cooling is a liquid sealed by the seal rings, the arrangement comprising; a fixed guide surface (G) adjacent and at least partially surrounding the shaft in a space containing liquid to be sealed by the seal rings, the fixed guide surface extending axially in a direction parallel to the shaft and adjacent the seal rings to be cooled, the guide surface including three continuous portions, a first portion (G1) extending continuously from a first position radially spaced from the circumference of the shaft blending into a second portion (G2) extending at an angle to the first portion and toward the shaft, the second portion blending into a third portion (G3) radially spaced from the circumference of the shaft a short distance which distance is substantially less than the radial spacing of the first portion from the shaft, the first and third portions of the guide surface positioned with respect to shaft rotation such that the shaft rotates in a direction from the first portion of the guide surface and hence drives and pumps the liquid coolant into and out of the third portion of the guide surface onto the adjacent seal ring for cooling.

2. An arrangement for liquid cooling seal rings as in claim 1 wherein the shaft is vertical an axial outer end of the guide surface is closed to seal rings and is radiused at an outer edge.

3. An arrangement for liquid cooling seal rings as in claim 2 wherein there are two identically shaped guide surfaces diametrically opposed with regard to the shaft.

4. An arrangement for liquid cooling seal rings as in claim 3 wherein each guide surface includes a single third portion sandwiched between two second and first continuous portions thus adapting the guide surface for use with a shaft rotatable in opposite directions.

References Cited

UNITED STATES PATENTS 2,992,842   7/1961   Shevchenko et al.

FOREIGN PATENTS 867,933   3/1953   Germany.

SAMUEL ROTHBERG, *Primary Examiner.*

U.S. Cl. X.R.

277—68